US012811768B2

(12) United States Patent
Tunstall

(10) Patent No.: US 12,811,768 B2
(45) Date of Patent: Nov. 24, 2026

(54) CORRECTING THE ALMOST BINARY EXTENDED GREATEST COMMON DIVISOR (GCD)

(71) Applicant: Cryptography Research, Inc., San Jose, CA (US)

(72) Inventor: Michael Tunstall, Walnut Creek, CA (US)

(73) Assignee: Cryptography Research, Inc., San Jose, CA (US)

( * ) Notice: Subject to any disclaimer, the term of this patent is extended or adjusted under 35 U.S.C. 154(b) by 1131 days.

(21) Appl. No.: 17/864,230

(22) PCT Filed: Jan. 20, 2021

(86) PCT No.: PCT/US2021/014228
§ 371 (c)(1),
(2) Date: Jul. 13, 2022

(87) PCT Pub. No.: WO2021/150637
PCT Pub. Date: Jul. 29, 2021

(65) Prior Publication Data

US 2023/0198739 A1 Jun. 22, 2023

Related U.S. Application Data

(60) Provisional application No. 62/964,437, filed on Jan. 22, 2020.

(51) Int. Cl.
*H04L 9/00* (2022.01)
*G06F 7/38* (2006.01)
(Continued)

(52) U.S. Cl.
CPC ................ *H04L 9/002* (2013.01); *G06F 7/38* (2013.01); *G06F 7/4986* (2013.01); *G06F 7/72* (2013.01)

(58) Field of Classification Search
None
See application file for complete search history.

(56) References Cited

U.S. PATENT DOCUMENTS 7,831,651 B2 * 11/2010 Kobayashi .............. G06F 7/728
708/492
2002/0174155 A1 11/2002 Hars et al.
(Continued)

OTHER PUBLICATIONS

Burton S. Kaliski Jr., :The montgomery inverse and its applications, IEEE Transactions on Computers, 44(8):1064-1065, 1995, 2 pages.
(Continued)

*Primary Examiner* — Gregory S Cunningham, II
(74) *Attorney, Agent, or Firm* — Lowenstein Sandler LLP

(57) ABSTRACT

Computing devices, methods, and systems for corrections to the “almost” binary extended GCD in a cryptographic operation of a cryptographic process are disclosed. Exemplary implementations may: receive, from a cryptographic process, a command to compute a binary extended greatest common denominator of a first input value and a second input value for a cryptographic operation; compute, by a binary extended GCD algorithm, the binary extended GCD using a multiplication with an inverse of two, instead of a division by two, to obtain a first output value; compute, by the binary extended GCD algorithm, a second output value and a third output value; and return, to the cryptographic process, the first output value, the second output value, and the third output value.

20 Claims, 5 Drawing Sheets

(51) Int. Cl.
*G06F 7/498* (2006.01)
*G06F 7/72* (2006.01)

(56) References Cited

U.S. PATENT DOCUMENTS

| | | | | | |
|---|---|---|---|---|---|
| 2003/0147529 | A1* | 8/2003 | Perkins | G06F 7/721 380/30 |
| 2005/0041811 | A1 | 2/2005 | Kobayashi et al. | |
| 2008/0114820 | A1 | 5/2008 | Amin et al. | |
| 2009/0144353 | A1* | 6/2009 | Pisek | G06F 7/728 708/491 |
| 2011/0194694 | A1* | 8/2011 | Struik | H04L 9/3252 380/255 |

OTHER PUBLICATIONS

C. D. Walter, "Montgomery exponentiation needs no Final subtractions", Electronic Letters, 35(21):1831-1832, Oct. 1999, 2 pages.
Donald E. Knuth, "The Art of Computer Programming", vol. 2, Seminumerical Algorithms, Addison Wesley, third edition, 1997, pp. 342-343, 2 pages.
Hachez, Gael et al, "Montgomery Exponentiation With No Final Subtractions: Improved Results", in C. K. Koc and C. Paar, editors, CHES 2000, vol. 1965, pp. 293-301, 2000, 9 pages.
Joppe W. Bos, "Constant time modular inversion", Journal of Cryptographic Engineering, 4(4):275-281, Aug. 2014. 7 pages.
Koc, Cetin Kaya, "A New Algorithm of Inversion Mod pK", Jun. 28, 2017, printed from https://eprint.iacr.org/2017/411.pdf , p. 1-19, 19 pages.
Notification of Transmittal of the International Search Report and the Written Opinion of the International Searching Authority, or the Declaration with Mail Date Apr. 7, 2021 re: Int'l Appln. No. PCT/US2021/014228. 12 pages.
P. Montgomery, "Modular multiplication without trial division", Mathematics of Computation, vol. 44, No. 170, pp. 519-521, Apr. 1985. 3 pages.
Savas, Erkay et al., "Montgomery Inversion", J Cryptogr Eng (2018) 8:201-210, Apr. 18, 2017, printed from http://cetinkoc.net/docs/j82.pdf, Springer-Verlag Berlin Heidelberg 2017, 10 Pages.
Shantz, Sheueling Chang, "From Euclid's GCD to Montgomery Multiplication to the Great Divide", Jun. 2001, printed from http://citeseerx.ist.psu.edu/viewdoc/download?doi=10.1.1.140.7944&rep=rep1&type=pdf , 2001 Sun Microsystems, Inc.—The SML Technical Report Series, 13 Pages.
"Handbook of Applied Cryptography, Chaper 14—Efficient Implementation", Handbook of Applied cryptography, Jan. 1, 1997, pp. 591-634, XP008055020. 44 pages.
EP Extended European Search Report with Mail Date Dec. 6, 2023 re: EP Appln. No. 21743985.0. 10 pages.
Guajardo, Jorge et al., "Efficient Software-Implementation of Finite Fields with Application to Cryptography", ACTA Applicandae Mathematicae, Kluwer Academic Publishers, DO, vol. 93, No. 1-3, Aug. 2, 2006, pp. 3-32, XP019432713, ISSN: 1572-9036, DOI:10.1007/S10440-006-9046-1. 30 pages.
Knuth, Donald E., "The Art of Computer Programming, vol. 2—Seminumerical Algorithms—Third Edition—The Greatest Common Divisor", Mar. 1, 2014, pp. 1-33, XP093105252, Retrieved from the Internet: URL:hppts://www.haio.ir/app/uploads/2022/01/the-art-of-computer-programing.-Vol.2.-Seminuerical-algorithms-by-Knuth-Donald-E-z-lib.org .pdf. 33 pages.

* cited by examiner

200

Algorithm 1: Extended binary GCD

```
202  Input x, y, n ∈ Z with n odd
204  Output: {GCD(x, y), a mod n, b mod n} where a x + b y ≡ GCD(x, y) (mod n)
206  u ← 1 ; v ← 0 ; s ← 0 ; t ← 1 r ← 0 ;
208  while (x∨y)∧1 = 0 do
     |  r ← r + 1 ; x ← x/2 ; y ← y/2;
     end

     while x ∧ 1 = 0 do
     |  x ← x/2 ;
     |  if u∧ 1 = 0 then  u = (u + n) /2 ;
     |  else  u = u/2 ;
     end

     while x ≠ y  do
     |  if y ∧ 1 = 0 then
     |  |  y ← y/2 ;
     |  |  if s ∧ 1 = 1 then  s = (s + n) /2 ;
     |  |  else  s = s/2 ;
     |  |  if t ∧ 1 = 1 then  t = (t + n) /2 ;
     |  |  else  t = t/2 ;
     |  else
     |  |  if y < x then  {x, y, u, a, v, b} ← {y, x, a, u, b, v} ;
     |  |  else
     |  |  |  y ← y − x ;
     |  |  |  {a.b} ← {a − u mod n, b − v mod n} ;
     |  |  end
     |  end
     end
     x ← 2^r x ;

     return {x, s, t}
```

FIG. 2

300

Algorithm 2: Corrected "Almost" Extended Binary GCD

```
302  Input x, y, n ∈ Z with n odd
304  Output: {GCD(x, y), a mod n, b mod n} where a x + b y ≡ GCD(x, y) (mod n)
306  r ← 0 ;
308  while (x∨y)∧1 = 0 do
       | r ← r + 1 ; x ← x/2 ; y ← y/2;
     end
310  k ← 0 ;
     while x∧1 = 0 do
       | k ← k + 1 ; x ← x + /2
     end

     a ← 0 ; b ← 2^k ; u ← 1; v ← 0 ;
     while x ≠ y do
       | if y∧1 = 0 then
       |   | {u, v} ← {2 u mod n, 2 v mod n} ;
       |   | k ← k + 1 ;
       | else
       |   | if y < x then
       |   |   | {x, y, u, a, v, b} ← {y, x, a, u, b, v} ;
       |   | else
       |   |   | y ← y − x ;
       |   |   | {a.b} ← {a − u mod n, b − v mod n} ;
       |   | end
       | end
     end
312  x ← 2^r x ;

     a ← MontMul_n (a 2^([log2 n] − [k/2])) ;
314  a ← MontMul_n (a 2^([log2 n] − [k/2])) ;
     b ← MontMul_n (b 2^([log2 n] − [k/2])) ;
     b ← MontMul_n (b 2^([log2 n] − [k/2])) ;
316  return {x, a, b}
```

FIG. 3

CORRECTING THE ALMOST BINARY EXTENDED GREATEST COMMON DIVISOR (GCD)

RELATED APPLICATIONS

This application claims the benefit of International Patent Application No. PCT/US2021/014228, filed Jan. 20, 2021, which claims the benefit of Provisional Application No. 62/964,437, filed Jan. 22, 2020, the entire contents of both are hereby incorporated by reference.

TECHNICAL FIELD

The present disclosure is generally related to computer systems, and is more specifically related to correcting the almost binary extended greatest common denominator (GCD).

BACKGROUND

Since the advent of computers, systems and methods for safeguarding cryptographic keys and/or other sensitive data have been constantly evolving. A device can perform one or more cryptographic operations for safeguarding keys, sensitive data, or the like. Some cryptographic operations involve arithmetic of large numbers, modular arithmetic, modular exponentiations, binary logarithm functions ($\log_2$ or log base 2), or the like. Some operations are more computationally intensive than others, including multiplications and especially divisions. Some cryptographic operations can be performed by a processor, such as a central processing unit (CPU), of a computing device. In some computing systems, a cryptographic coprocessor can be used to compute some or all of the cryptographic operations. In general, the cryptographic coprocessors can be used to accelerate the combination of large-number arithmetic to support cryptographic operations. A greater efficiency can be achieved when the cryptographic coprocessor can perform a large computation when one instruction is issued by the CPU performing the cryptographic operation.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 is an example extended GCD algorithm (Algorithm 1) according to one embodiment.

FIG. 3 is an example corrected "almost" extended GCD algorithm (Algorithm 2) according to one embodiment.

DETAILED DESCRIPTION

Figure 1:
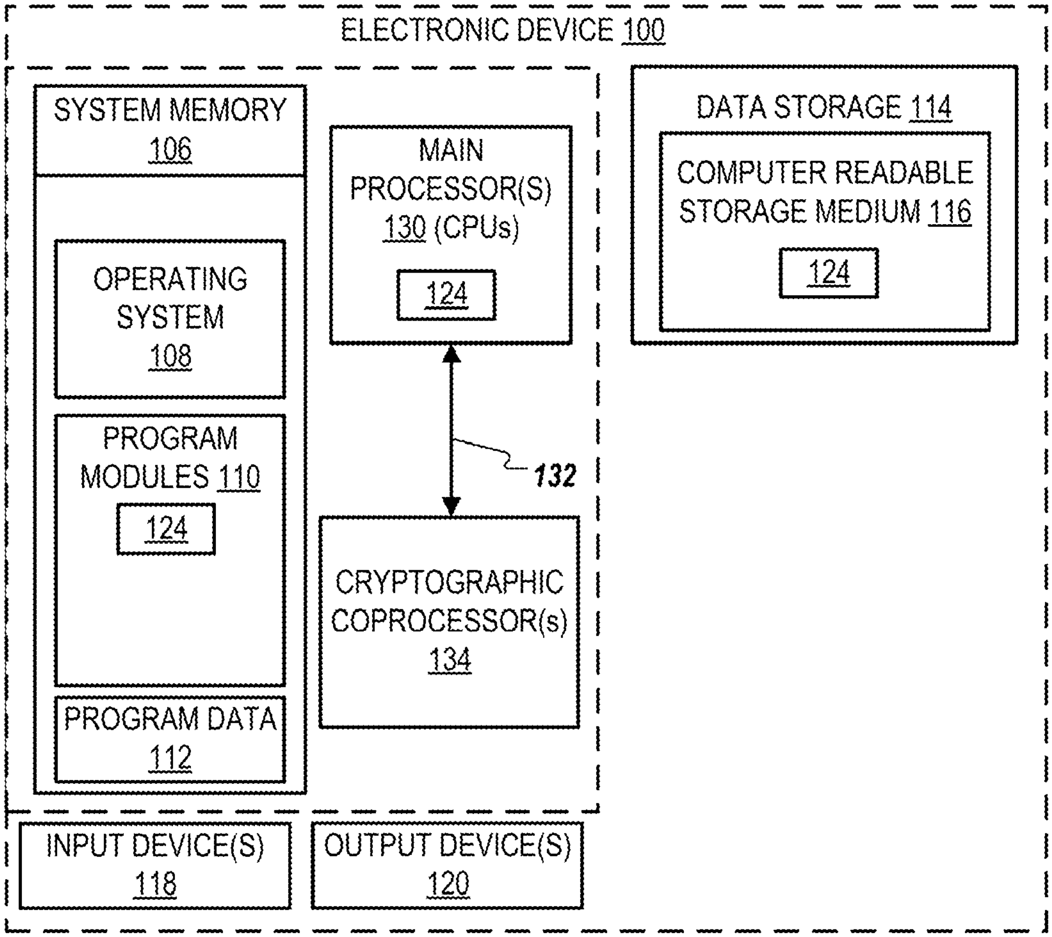
FIG. 1 is a block diagram of an electronic device for corrections to the "almost" binary extended GCD in a cryptographic operation of a cryptographic process according to one embodiment.

Embodiments described herein relate to computing platforms, methods, and systems for corrections to the "almost" binary extended greatest common denominator (also referred to as greatest common divisor) in cryptographic operations of cryptographic processes. As described above, some cryptographic operations (e.g., divisions) are more computationally intensive than others. For an example, when inverting a public exponent modulo the product of two primes to produce a private exponent, a cryptographic operation computes a binary extended GCD. A binary GCD algorithm computes a GCD of two nonnegative integers using arithmetic operations. The binary GCD is derived from repeated application of a set of identifies to produce an algorithm well suited to many computer architectures. The following set of six identities can be used to produce a binary GCD algorithm:

---

Identity 1: $\gcd(\alpha, \beta) = \gcd(\beta, \alpha)$
Identity 2: $\gcd(\alpha, \beta) = 2 \gcd(\alpha/2, \beta/2)$ for $\alpha$, $\beta$ even
Identity 3: $\gcd(\alpha, \beta) = \gcd(\alpha/2, \beta)$ for $\alpha$ even, $\beta$ odd
Identity 4: $\gcd(\alpha, \beta) = \gcd((\alpha-\beta)/2, \beta/2)$ for $\alpha$, $\beta$ odd and $\alpha > \beta$
Identity 5: With $\alpha \geq \beta$, if $((\alpha \oplus B) \wedge 2 = 2$, then $\gcd(\alpha, \beta) = \gcd((\alpha+\beta)/4, \beta)$,
  else (i.e., $\alpha \geq \beta$, if $((\alpha \oplus B) \wedge 2 \neq 2))$ $\gcd(\alpha, \beta) = \gcd((\alpha-\beta)/4), \beta)$
Identity 6: $\gcd(\alpha, \alpha)$

---

For example, to compute the gcd(x; y), a first variable ($\alpha$) is set to equal the first input value (x) and a second variable ($\beta$) is set to equal the second input value (y) and the set of identities above are applied to the first variable ($\alpha$) and the second variable ($\beta$) until a condition is met, the condition being $\alpha=\beta$ or $\beta=0$, i.e., the first variable ($\alpha$) being equal to the second variable ($\beta$) or the second variable ($\beta$) being equal to zero. This gives the GCD of $2^r\alpha$, where identity 2 has been applied r times.

D. Knuth in "The Art of Computer Programming, volume 2, Seminumerical Algorithms," describes how to extend the algorithm to also compute two coefficients, a and b, given x and y in the following equation (1):

$$ax+by=gcd(x,y) \tag{1}$$

There are numerous ways of implementing the binary extended GCD using the set of identities given above, but with further computations. In one implementation, to compute the extended GCD of g; h, the following six variables are set as follows:

$$\alpha \leftarrow g, \beta < h, u \leftarrow 1, v \leftarrow 0, s \leftarrow 0 \text{and } t \leftarrow 1$$

That is, the extended GCD algorithm sets a first variable ($\alpha$) equal to the first input value (g), and a second variable ($\beta$) equal to the second input value (h), a third variable (u) equal to one, a fourth variable (v) equal to zero, a fifth variable(s) equal to zero, and a sixth variable (t) equal to one. The third, fourth, fifth, and sixth variables can be considered coefficients of polynomials, as set forth in the following equations (2):

$$\alpha=ug+vh$$

$$\beta=sg+th \tag{2}$$

In applying the above identities to the first and second variables $\{\alpha\ \beta\}$, the following requirements can be added to the set of identifies for the third, fourth, fifth, and sixth variables {u, v, s, t} as follows:

- Identity 1: $\gcd(\alpha, B\}=\gcd(\beta, \alpha)$, requires $\{u, v, s, t\} \leftarrow \{s, t, u, v\}$.
- Identity 2: $\gcd(\alpha, B)=2 \gcd(\alpha/2, \beta/2)$ for $\alpha$, $\beta$ even, requires to note a number of times this identity is applied and multiply the output GCD by $2^r$, where identity 2 has been applied r times.

Identity 3: gcd(α, β)=gcd(α/2, β) for α even, β odd, requires $$\{u, v\} \leftarrow \left\{\frac{u}{2}, \frac{v}{2}\right\}$$

for identity 2 to remain valid. Λˆ

Identity 4: gcd(α, β)=gcd((α−B)/2, β/2) for α, β odd and α>β, requires $$\{u, v\} \leftarrow \left\{\frac{u-s}{2}, \frac{v-t}{2}\right\}$$

for identity 2 to remain valid.

Identity 5: With α≥β, if ((α⊗βΛ2=2 then gcd(α, β)=gcd ((α+β)/4, β), which requires $$\{u, v\} \leftarrow \left\{\frac{u+s}{4}, \frac{v+t}{4}\right\}$$

for identity 2 to remain valid. Likewise, with a α≥β, if ((α⊗Λ2≠2 then gcd(α, β)=gcd((α−β)/4), β), requires $$\{u, v\} \leftarrow \left\{\frac{u-s}{4}, \frac{v-t}{4}\right\}$$

for identity 2 to remain valid.

Identity 6: gcd(α, 0)=α, terminates the algorithm and returns {u, v} as a solution to ug+vh=gcd(g,h) and gcd(α, α)=α, terminates the algorithm and returns {u, v} as a solution to ug+vh=gcd(g, h).

It should be noted that Identity 2, as set forth above, is typically used at the beginning of the computations of the binary extended GCD algorithm to remove all common multiples of two. It should be noted that applying this identity does not affect the relationship expressed in the equations (2). As noted above, the number of times this identity is applied is tracked so that the output GCD can be multiplied by $2^r$, where r is the number of times this identity (Identity 2) has been applied in the binary extended GCD algorithm. An example of applying these rules is given in Algorithm 1 of FIG. 2, where the outputs are returned as reduced modulo n, where n is the input modulus value. That is, coefficients a and b can be computed given input values x and y, where: ax+by ≡gcd(x, y) (mod n).

The set of identities described above include multiple divisions by two and even some divisions by four. As described above, the division of large numbers can be computationally intensive. Some embodiments described herein replace the divisions by two (where modular arithmetic is involved) in Algorithm 1 in FIG. 2 with a multiplication with the inverse of two. This can have the advantage of the algorithm being concerned with whether a value is odd or even. In some cases, the multiplications with the inverse of two can be pushed to an end of the algorithm, producing an algorithm that is similar to Algorithm 2 of FIG. 3, for example. A correction can be applied to ensure that all the variables have the same power of two applied to them. For example, in avoiding divisions by two, the set of identities given above can be changed to what is required to exchange divisions by two with multiplications by two, since {u, v} and {s, t} need to be multiplied by the same power of two to be able to add or subtract elements from elements of the other, as described below with respect to the Algorithm 2 of FIG. 3.

Embodiments described herein relate to computing platforms, methods, and systems for corrections to the "almost" binary extended GCD (also referred to as greatest common divisor) in cryptographic operations of cryptographic processes. Exemplary implementations may: receive, from a cryptographic process, a command to compute a binary extended greatest common denominator of a first input value and a second input value for a cryptographic operation; compute, by a binary extended GCD algorithm, the binary extended GCD using a multiplication with an inverse of two, instead of a division by two, to obtain a first output value; compute, by the binary extended GCD algorithm, a second output value and a third output value; and return, to the cryptographic process, the first output value, the second output value, and the third output value. In addition to exchanging operations that include divisions by two with multiplications with an inverse of two, modular exponentiation and "almost" modular inverse operations can be used to achieve the advantages described herein. It should be noted that implementations of modular exponentiation of large numbers typically use Montgomery multiplications, as described below. The "almost" modular inverse uses an identity that gcd(n,b)=1, where n is an input modulus value, as described below.

Aspects of the present disclosure overcome the deficiencies of traditional binary extended GCD algorithms by increasing the efficiency of the computations to compute a binary extended GCD of two input values. Aspects of the present disclosure can further increase the efficiency by allowing the coprocessor to perform a large computation when one instruction is issued. That is, traditional systems issue individual commands to the coprocessor to perform a lot of small operations and the coprocessor can be idle between these small operations. The coprocessor can be idle because the issuer is obliged to check a status of the coprocessor, check that a command can be issued, issue the command to the coprocessor, poll a status register for a command to finish or wait for an interrupt and process that interrupt, and check the status of the coprocessor again. In some cases, traditional systems can spend more time checking register values than computing a desired output. The overhead in connection with managing communications with the coprocessor reduces the efficiency of the system and can delay the computation. As described herein, the greatest increase in efficiency can be achieved when the coprocessor performs a large computation for one instruction, as compared to many instructions for smaller computations. Aspects of the present disclosure use an "almost" extended GCD algorithm, where all divisions (e.g., divisions by two or four) are deferred to the end of the computation and are substituted with multiplications (e.g., modular exponentiations, Montgomery multiplications). That is, these divisions can be supplied to the coprocessor using two Montgomery multiplications (or other modular exponentiation operations) with chosen powers of two. Using these Montgomery multiplications, rather than using a lot of smaller instructions, allows the coprocessor and processor to operate more efficiently. The coprocessor can also accelerate the computation of the "almost" extended GCD. For example, a configuration where a processor and a coprocessor operating at 50 MHz, the "almost" extended GCD algorithm reduces the required computation to a third of that of traditional algorithms.

Aspects of the present disclosure can compute an extended GCD in connection with performing a cryptographic operation, such as inverting a public exponent modulo the product of two primes to produce a private exponent. It should also be noted that, when using a cryptographic coprocessor, the choice of algorithms is not the same as on a desktop computer. That is, when using the cryptographic coprocessor, it is beneficial to reduce the number of smaller operations sent to the coprocessor to minimize the overhead of managing the communications with the coprocessor.

"Cryptographic operation" herein shall refer to a data processing operation involving secret parameters (e.g., encryption/decryption operations using secret keys). "Cryptographic data processing device" herein shall refer to a data processing device (e.g., a general purpose or specialized processor, a system-on-chip, a cryptographic hardware accelerator, or the like) configured or employed for performing cryptographic data processing operations. "External monitoring attack" herein shall refer to a method of gaining unauthorized access to protected information by deriving one or more protected information items from certain aspects of the physical implementation and/or operation of the target cryptographic data processing device. Side channel attacks are external monitoring attacks that are based on measuring values of one or more physical parameters associated with operations of the target cryptographic data processing device, such as the elapsed time of certain data processing operations, the power consumption by certain circuits, the current flowing through certain circuits, heat or electromagnetic radiation emitted by certain circuits of the target cryptographic data processing device, etc.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation. In particular, the bus width values referenced in the accompanying description are for illustrative purposes only and do not limit the scope of the present disclosure to any particular bus width values.

FIG. 1 is a block diagram of an electronic device 100 for corrections to the "almost" binary extended GCD 124 in a cryptographic operation of a cryptographic process according to one embodiment. The electronic device 100 may correspond to the electronic devices described herein with respect to FIGS. 2-6. The electronic device 100 may be connected to other computing devices in a LAN, an intranet, an extranet, and/or the Internet. The electronic device 100 may operate in the capacity of a server machine or a client machine in client-server network environment. The electronic device 100 may be provided by a personal computer (PC), a mobile device, a set-top box (STB), a server, a network router, switch or bridge, or any machine capable of executing a set of instructions (sequential or otherwise) that specify actions to be taken by that machine. Further, while only a single electronic device 100 is illustrated, the terms "electronic device" or "computing system" shall also be taken to include any collection of computing devices that individually or jointly execute a set (or multiple sets) of instructions to perform the methods described herein. Alternatively, the electronic device 100 may be other electronic devices, as described herein.

The electronic device 100 includes one or more processor(s) 130, such as one or more CPUs, microcontrollers, field programmable gate arrays, or other types of processors. The one or more processor(s) 130 can include one or more processing cores. The electronic device 100 can also include one or more cryptographic processor(s) 134. The cryptographic processor(s) 134 can be dedicated processing logic comprising hardware, software, firmware, or any combination thereof for handling computations, including computations for a cryptographic process. The cryptographic process can be performed by the processor(s) 130 as the main processor and can issue one or more instructions 132 to the cryptographic processor(s) 134 for computations, such as one or more Montgomery multiplications for computing the binary extended GCD. The electronic device 100 also includes system memory 106, which may correspond to any combination of volatile and/or non-volatile storage mechanisms. The system memory 106 can include synchronous dynamic random access memory (DRAM), read-only memory (ROM), flash memory, internal or attached storage devices), or the like. The system memory 106 stores information that provides operating system component 108, various program modules 110, program data 112, and/or other components. In one embodiment, the system memory 106 stores instructions of methods to control operation of the electronic device 100. The electronic device 100 performs functions by using the processor(s) 130 to execute instructions provided by the system memory 106. In one embodiment, the program modules 110 may include a binary extended GCD algorithm 124. The binary extended GCD algorithm 124 can be the Algorithm 1 of FIG. 2, the Algorithm 2 of FIG. 3, except with any modifications described herein. The binary extended GCD algorithm 124 can include command communication module 508, GCD computing module 510, modular exponentiation module 512, and/or other modules of computing system 500 described in connection with FIG. 5. The computing system 500 may perform some or all of the operations for corrections to the "almost" binary extended GCD in a cryptographic operation of a cryptographic process described herein, such as method 400 described in connection with FIG. 4. In one embodiment, the electronic device 100 computes the binary extended GCD as part of a cryptographic operation to invert a public exponent modulo the product of two primes to produce a private exponent. Alternatively, the binary extended GCD can be computed in connection with other cryptographic operations, non-cryptographic operations, or the like.

The electronic device 100 also includes a data storage device 114 that may be composed of one or more types of removable storage and/or one or more types of non-removable storage. The data storage device 114 includes a computer-readable storage medium 116 on which is stored one or more sets of instructions embodying any of the methodologies or functions described herein. While the computer-readable storage medium 116 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media. Instructions for the program modules 110 (e.g., computing system 500) may reside, completely or at least partially, within the computer-readable storage medium 116, system memory 106 and/or within the processor(s) 130 during execution thereof by the electronic device 100, the system memory 106 and the processor(s) 130 also constituting computer-readable media. The instructions may further be transmitted or received over a network via a network interface device. The network interface device can communicate with one or more devices over wired or wireless connections. The network interface device can communicate over a private network, a public network, or any combination thereof. The electronic device 100 may also include one or more input devices 118 (keyboard, mouse device, specialized selection keys, etc.) and one or more output devices 120 (displays, printers, audio output mechanisms, etc.). The electronic device 100 can include other components, such as video display units, input devices, and signal generation devices. These components can be integrated into one or many components.

Implementations of modular exponentiation of large numbers on an embedded device typically make use of Montgomery multiplication. The interleaved word-by-word multiplication and modular reduction is, typically, significantly faster than integer multiplication followed by a modular reduction. In short, Montgomery multiplication computes x y mod (n), x, y, z, ∈Z, by computing xy+rn, where r is chosen such that the least significant $\lceil \log_2 n \rceil$ bits of the result are set to zero. These bits can then be omitted and the most significant bits are returned and the error is noted. In practice, $\lceil \log_2 n \rceil$ would be a multiple of a word size of a computing platform. As described herein, the following function is defined for the Montgomery multiplication:

$$\mathrm{MontMul}_n : Z_n^2 \leftarrow Z_n : x,y \leftarrow xy2^{-\lceil \log 2n \rceil}$$

The performance of a cryptographic operation by an integrated circuit may result in the susceptibility of the integrated circuit to an external monitoring attack (e.g., a side channel attack) where an attacker of the integrated circuit may obtain secret information as the cryptographic operation is performed. In an illustrative example, an attacker may exploit interactions of sequential data manipulation operations which are based on certain internal states of the target data processing device. Examples of a side channel attack includes, but is not limited to, a Simple Power Analysis (SPA) or a Differential Power Analysis (DPA). The attacker may apply DPA methods to measure the power consumption by certain circuits of a target cryptographic data processing device responsive to varying one or more data inputs of sequential data manipulation operations, and thus determine one or more protected data items (e.g., encryption keys) which act as operands of the data manipulation operations. Such an attacker may be an unauthorized entity that may obtain information of the cryptographic operation by analyzing power consumption measurements of the integrated circuit over a period of time. Accordingly, when the cryptographic operation is performed, the attacker may be able to retrieve secret information (e.g., a secret key) that is used during the cryptographic operation. Protecting cryptographic operations from external monitoring attacks may involve employing variable masking schemes. In an illustrative example, the external monitoring attack countermeasures may include applying a randomly generated integer mask to a secret value by performing the bitwise exclusive disjunction operation. In order to mask a secret value S, a mask M is applied to it by the exclusive disjunction operation; to remove the mask, the exclusive disjunction is performed on the masked secret value and the mask. In more complex scenarios, e.g., in which a masked value is processed by a non-linear operation, the mask correction value (i.e., the value that is employed to remove a previously applied mask) may differ from the mask.

An SPA resistant implementation of the main loop of the binary extended GCD algorithm 124 is straightforward. However, the result of the main loop of a Montgomery multiplication requires a conditional subtraction of the modulus. In some implementations, it is assumed that this is done in some manner that does not produce a vulnerability to SPA, such as by a redundant subtraction or some other method. However, in the following description, it is assumed that Montgomery multiplication can be used without requiring any special consideration to prevent SPA.

Also, as described herein, embodiments of the binary extended GCD algorithm 124 can be considered to be a corrected "almost" binary extended GCD algorithm because an "almost" modular inverse is used to avoid divisions while repeatedly applying the set of identities to the variables. Algorithms for computing an "almost" modular inverse are described by Burton S. Kaliski Jr in "The Montgomery Inverse and Its Applications" (IEEE Transactions on Computers," 44(8): 1064-1065, 1995) and Joppe W. Bos in "Constant Time Modular Inversion" (Journal of Cryptographic Engineering, 4 (4): 275-281, August 2014), to compute the following:

$$2^k b^{-1} \bmod n,$$

where n, b∈Z and GCD(n; b)=1 and $\lceil \log 2\ n \rceil \le k \le 2 \lceil \log 2\ n \rceil$.

It is the remaining power of two that gives the binary extended GCD algorithm 124 the "almost" qualifier. A variety of mechanisms for removing this power of two are proposed, such as using a look-up table or conducting divisions by two at the end of the algorithm, such as done by the Montgomery multiplications in Algorithm 2 of FIG. 3. That is, the divisions by two in Algorithm 1 of FIG. 2 can be replaced with a multiplication with the inverse of two. This has the advantage that the algorithm does not need to be concerned with whether a value is odd or even, even if it produces a slower algorithm. By combining the multiplication substitution with the "almost" modular inverse, all of these multiplications get pushed to an end of the algorithm (after the repeated application of the identities). As described herein, a correction is required to ensure that all the variables have the same power of two applied to them. That is, the set of identities given above can be changed to what is required to exchange divisions by two with multiplications by two. For example, {u, v} and {s, t} need to be multiplied by the same power of two to able to add or subtract elements from elements of the other.

FIG. 2 is an example extended GCD algorithm 200 (Algorithm 1) according to one embodiment. The extended GCD algorithm 200 receives three inputs 202, including x, y, n, where n is odd, computes an extended GCD 204 that is output as {x, a, b}, where ax+by ≡GCD (x,y) (mod n). That is, the extended GCD 204 is returned as reduced modulo n. In general, the extended GCD algorithm 200 includes an initialization operation 206 that sets the variables and a loop 208 of operations that apply the identities described herein. Some of the operations are illustrated as dividing by two. As described herein, these operations can be modified to multiplication with an inverse of two. The other variables also need to be modified to be the same powers to permit additions and subtractions. Operation 212 multiplies a result (x) of the main loop 208 by two to the power of r, where r is a number of times the Identity 2 is applied during the main loop 208. Operation 214 returns the result, {x, s, t}, as the extended GCD 204 to the cryptographic process that requested that the extended GCD be computed. The variable x becomes the output GCD (x), the variable s becomes the coefficient a, and the variable t becomes the coefficient b.

FIG. 3 is an example corrected "almost" extended GCD algorithm 300 (Algorithm 2) according to one embodiment. The corrected "almost" extended GCD algorithm 300 receives three inputs 302, including x, y, n, where n is odd, computes an extended GCD 304 that is output as {x, a, b}, where ax+by ≡GCD (x,y) (mod n). That is, the extended GCD 304 is returned as reduced modulo n. In general, the corrected "almost" extended GCD algorithm 300 includes an operation 306 that initializes a counter (r) to zero to count and track a number of times the divisions by two occur and operation 310 that initializes a counter (k) to zero to count and track a number of times the divisions by two are missed during a main loop 308. Some of the operations are illustrated as dividing by two. As described herein, these operations can be modified to multiplication with an inverse of two. The other variables also need to be modified to be the same powers to permit additions and subtractions. Operation 312 multiplies a result (x) of the main loop 308 by two to the power of r, where r is a number of times the Identity 2 is applied during the main loop 308. One or more operations 314 compute the Montgomery multiplications as described herein. The Montgomery multiplications can be issued to a coprocessor to compute. Operation 316 returns the result, {x, a, b}, as the extended GCD 304 to the cryptographic process that requested that the extended GCD be computed. The variable x becomes the output GCD (x), the variable s becomes the coefficient a, and the variable t becomes the coefficient b.

In one embodiment, to compute the binary extended GCD without divisions by two, the variables can be initialized as described above and a counter (k) can be set to zero to record a number of divisions that have been missed while iterating through the binary extended GCD algorithm. In some embodiments, some of the set of identities described above can be further modified to require the counter (k) to be incremented accordingly. The following is an example of modifications to Identity 3, Identity 4, and Identity 5:

Identity 3: god (α, β)=gcd(α/2, β) for α even, β odd, requires {s, t}←{2s, 2t} and increment k.

Identity 4: gcd(α, β)=gcd((α−β)/2, β/2) for α, β odd and α>β, requires {u, v, s, t}←{u−s, v−t, 2s, 2t} and increment k.

Identity 5: With α≥β, if ((α⊗βΛ2=2 then gcd(α, β)=gcd ((α+β)/4, β), which requires {u, v, s, t}←{u+s, v+t, 4s, 4t} and increment k by two. Likewise, with α≥β, if ((α⊗βΛ2≠2 then gcd(α, β)=gcd((α−β)/4), β), requires {u, v}←{u−s, v−t, 4s, 4t} and increment k by two.

At the end of the binary extended GCD algorithm 124, an error that has accumulated during the iterations of the main loop can be corrected using Montgomery multiplication. In one embodiment, where the computations in the main loop are performed by the processor(s) 130, the processor(s) 130 can issue four instructions 132 to the cryptographic coprocessor(s) 134 to compute the four Montgomery multiplications, one instruction per multiplication operation. When using the cryptographic coprocessor(s) 134, the correction of the error can be fast since only 4 instructions are needed to compute the correction.

In one embodiment, the electronic device 100 includes a memory device to store instructions of the binary extended GCD algorithm 124, a first processor coupled to the memory device, and a second processor coupled to the first processor and the memory device. The instructions, when executed by the first processor, cause the first processor to compute, as part of a cryptographic operation, a binary extended GCD of a first input value (x) and a second input value (y) using the binary extended GCD algorithm to obtain a first output value (α), a second output value (u), and a third output value (v). The binary extended GCD algorithm, executed by the first processor, computes the binary extended GCD using a multiplication with an inverse of two instead of a division by two. The second output value is a first integer (a) and the third output value is a second integer (b), where a sum of a first product of the first integer and the first input value (x) and a second product of the second integer and the second input value (y) is equal to the first output value. The binary extended GCD algorithm tracks a first number of times a first identity (e.g., Identity 2) is applied by the binary extended GCD algorithm until a condition is met. The condition can be met responsive to a first variable (α) being equal to a second variable (β) or the second variable (β) being equal to zero. The first processor can multiply the first output value (α) by two to the power of the first number to obtain the binary extended GCD. As described herein, the binary extended GCD algorithm can remove all common multiples of two, typically at a beginning of the computation. By tracking the first number of times the first identity is applied, the binary extended GCD algorithm can multiply the output GCD (result of the main loop) by two to the power of this first number. Also, after the results of the main loop are multiplied by two to the power of the first number, the first processor can issue one or more commands to the second processor to compute, using a Montgomery multiplication, a product of the first variable (α) and the second variable (β) modulus n, where n is an input modulus value specified by the cryptographic operation. The second processor sends the second output value (u) and the third output value (v) back to the first processor. The first processor receives the second output value (u) and the third output value (v) from the second processor and returns, to the cryptographic process, the first output value (α), the second output value (u), and the third output value (v).

In another embodiment, to compute the binary extended GCD, the first processor is to set the first variable (α) equal to the first input value (x), and the second variable (β) equal to the second input value (y), a third variable (u) equal to one, a fourth variable (v) equal to zero, a fifth variable(s) equal to zero, and a sixth variable (t) equal to one. The first processor repeatedly applies a set of identities to the first variable (α) and the second variable (β) until the condition is met. The set of identities can include the first identity that is applied when both the first variable (α) and the second variable (β) are even values. As described above, the one or more commands are issued by the first processor to the second processor after the condition is met. In one embodiment, the first processor issues the one or more commands as four commands, including: a first command for a first Montgomery multiplication using the third variable (u) and two to the power of a first value to obtain a second value, where the first value is a difference between half of a second counter (k) and a bit length of (n) (k/2); a second command for a second Montgomery multiplication using the second value and two to the power of the first value to obtain a third value, where the third value is the second output value (u); a third command for a third Montgomery multiplication using the fourth variable (v) and two to the power of the first value to obtain a fourth value; and a fourth command for a fourth Montgomery multiplication using the fourth value and two to the power of the first value to obtain a fifth value, wherein the fifth value is the third output value (v). It should be noted that in one multiplication, k/2 is rounded up when k is even, and in the other multiplication, k/2 is rounded down when k is odd. Further, the bit length of n also assumes that n is divisible by a word size of the processor. If n is not divisible by the word size then n will be rounded up to the nearest multiple of that word size. Nothing is explicitly done, it is just the effect of the Montgomery multiplication.

In another embodiment, to compute the binary extended GCD, the first processor is to perform various operations, including: an initialization operation to set the first variable (α) equal to the first input value (x), the second variable (β) equal to the second input value (y), the third variable (u) equal to one, the fourth variable (v) equal to zero, the fifth variable(s) equal to zero, the sixth variable (t) equal to one, a first counter (r) to zero, and a second counter (k) to zero; a second operation to increment the first counter (r), divide the first variable (α) by two, and divide the second variable (β) by two, responsive to both the first variable (α) and the second variable (β) being even numbers; a third operation to switch the first variable (α) and the second variable (β), switch the third variable (u) and the fifth variable(s), and switch the fourth variable (v) and the sixth variable (t), responsive to the second variable (β) being an even number; a fourth operation to check whether the first variable (α) is equal to the second variable (β); a fifth operation to increment the second counter (k), divide the first variable (α) by two, calculate a product of two and the fifth variable(s) modulus n, and calculate a product of two and the sixth variable (t) modulus n, responsive to the first variable (α) being an even number and the first variable (α) not being equal to the second variable (β); and a sixth operation to subtract the second variable (β) from the first variable (α), subtract the fifth variable(s) from the third variable (u), and subtract the sixth variable (t) from the fourth variable (v), responsive to the first variable (α) being an odd number and the first variable (α) not being equal to the second variable (β); a seventh operation to multiply the first variable (α) by two to the power of the current number of times the first identity is applied; an eighth operation to perform a first Montgomery multiplication using the third variable (u) and two to the power of a first value to obtain a second value, wherein the first value is a difference between half of the second counter (k) and a bit length of (n); a ninth operation to perform a second Montgomery multiplication using the second value and two to the power of the first value to obtain a third value, wherein the third value is the second output value (u); a tenth operation to perform a third Montgomery multiplication using the fourth variable (v) and two to the power of the first value to obtain a fourth value; and an eleventh operation to perform a fourth Montgomery multiplication using the fourth value and two to the power of the first value to obtain a fifth value, wherein the fifth value is the third output value (v).

Figure 4:
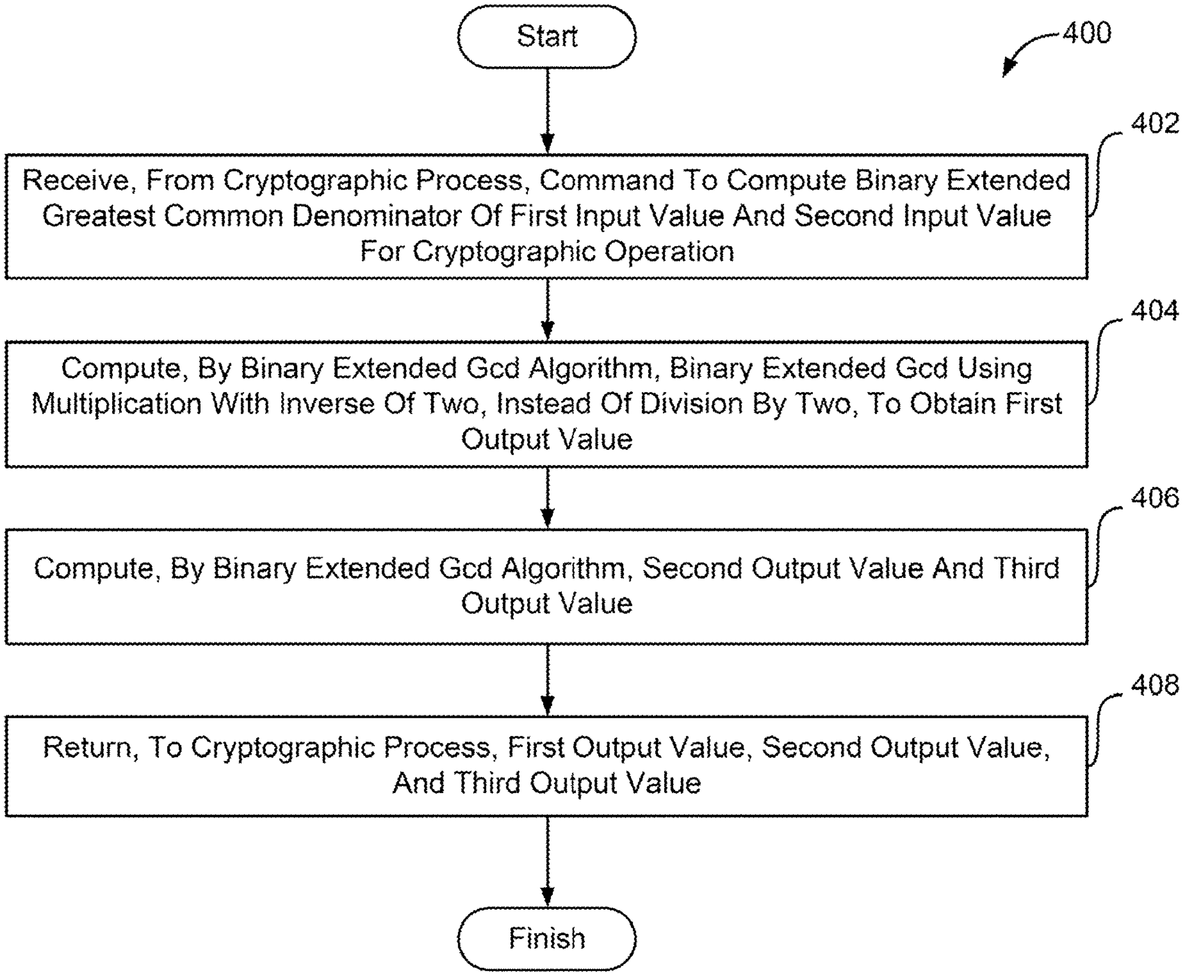
FIG. 4 is a flow diagram of a method for corrections to the "almost" binary extended GCD in a cryptographic operation of a cryptographic process according to one embodiment.

FIG. 4 is a flow diagram of method 400 for corrections to the “almost” binary extended GCD in a cryptographic operation of a cryptographic process according to one embodiment. The method 400 may be performed by processing logic that comprises hardware (e.g., circuitry, dedicated logic, programmable logic, microcode, etc.), software, firmware, or a combination thereof. In some embodiments, the method 400 may be performed by any of the electronic device(s) 100, computing device(s) 502 and/or remote platform(s) 504 described in connection with FIGS. 1 and/or 5.

The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

At block 402, method 400 may include receiving, from a cryptographic process, a command to compute a binary extended greatest common denominator of a first input value and a second input value for a cryptographic operation. The operation(s) at block 402 may be performed by one or more hardware processors configured by machine-readable instructions including a module that is the same as or similar to command communication module 508, in accordance with one or more implementations.

At block 404, method 400 may include computing, by a binary extended GCD algorithm, the binary extended GCD using a multiplication with an inverse of two, instead of a division by two, to obtain a first output value. The operation(s) at block 404 may be performed by one or more hardware processors configured by machine-readable instructions including a module that is the same as or similar to GCD computing module 510, in accordance with one or more implementations.

At block 406, method 400 may include computing, by the binary extended GCD algorithm, a second output value and a third output value. The second output value may be a first integer and the third output value is a second integer. A sum of a first product of the first integer and the first input value and a second product of the second integer and the second input value may be equal to the first output value. The operation(s) at block 406 may be performed by one or more hardware processors configured by machine-readable instructions including a module that is the same as or similar to modular exponentiation module 512, in accordance with one or more implementations.

At block 408, method 400 may include returning, to the cryptographic process, the first output value, the second output value, and the third output value. The operation(s) at block 408 may be performed by one or more hardware processors configured by machine-readable instructions including a module that is the same as or similar to command communication module 508, in accordance with one or more implementations.

In some implementations of the method 400, returning the first output value, the second output value, and the third output value at block 408 may include returning the first output value, the second output value, and the third output value as reduced modulo n, where n may be an input modulus value specified in the command.

In some implementations of the method 400, computing the binary extended GCD may include setting a first counter to zero, a second counter to zero, a first variable equal to the first input value, and a second variable equal to the second input value. In some implementations of the method 400, computing the binary extended GCD may include determining an intermediate GCD by repeatedly applying a set of identities to the first variable and the second variable until a condition is met. In some implementations of the method 400, the condition may include the first variable being equal to the second variable or the second variable being equal to zero. In some implementations of the method 400, computing the binary extended GCD may include tracking, using the first counter, a first number of times a first identity of the set of identities is applied by the binary extended GCD algorithm until the condition is met. In some implementations of the method 400, computing the binary extended GCD may include tracking, using the second counter, a second number of multiplications with the inverse of two that have been done by the binary extended GCD algorithm until the condition is met. In some implementations of the method 400, computing the binary extended GCD may include multiplying the intermediate GCD by two to the power of the first number in the first counter to obtain the first output value. In some implementations of the method 400, computing the binary extended GCD may include computing, using a Montgomery multiplication, a product of the first variable and the second variable modulus n. In some implementations of the method 400, where n may be an input modulus value specified in the command.

In some implementations of the method 400, computing the binary extended GCD may further include setting a third variable equal to one, a fourth variable equal to zero, a fifth variable equal to zero. In some implementations of the method 400, a sixth variable equal to one. In some implementations of the method 400, computing the binary extended GCD may further include repeatedly applying the set of identities to the third variable, the fourth variable, the fifth variable, and the sixth variable until the condition is met. In some implementations of the method 400, computing the product may further include performing a first Montgomery multiplication using the third variable and two to the power of a first value to obtain a second value. In some implementations of the method 400, the first value may be a difference between half of the second counter and a bit length of (n). In some implementations of the method 400, computing the product may further include performing a second Montgomery multiplication using the second value and two to the power of the first value to obtain a third value. In some implementations of the method 400, the third value may be the second output value. In some implementations of the method 400, computing the product may further include performing a third Montgomery multiplication using the fourth variable and two to the power of the first value to obtain a fourth value. In some implementations of the method 400, computing the product may further include performing a fourth Montgomery multiplication using the fourth value and two to the power of the first value to obtain a fifth value. In some implementations of the method 400, the fifth value may be the third output value.

In some implementations of the method 400, computing the binary extended GCD may further include setting a first variable equal to the first input value. In some implementations of the method 400, a second variable equal to the second input value, a third variable equal to one, a fourth variable equal to zero, a fifth variable equal to zero. In some implementations of the method 400, a sixth variable equal to one. In some implementations of the method 400, computing the binary extended GCD may further include repeatedly applying a set of identities to the first variable and the second variable until a condition is met. In some implementations of the method 400, the condition may include the first variable being equal to the second variable or the second variable being equal to zero. In some implementations of the method 400, computing the binary extended GCD may further include, after the condition is met, multiplying the first variable by two to the power of a current number of times a first identity of the set of identities is applied by the binary extended GCD algorithm when the condition is met. In some implementations of the method 400, the first identity may be applied when both the first variable and the second variable are even values. In some implementations of the method 400, computing the binary extended GCD may further include, after the condition is met, computing, using a Montgomery multiplication, a product of the first variable and the second variable modulus n. In some implementations of the method 400, the Montgomery multiplication may be based on a current number of multiplications with the inverse of two that has been done by the binary extended GCD algorithm when the condition is met.

In some implementations of the method 400, computing the binary extended GCD may further include performing a first Montgomery multiplication using the third variable and two to the power of a first value to obtain a second value. In some implementations of the method 400, the first value may be a difference between half of a second number of a second counter and a bit length of (n). In some implementations of the method 400, the second number may be a number of multiplications with the inverse of two that have been done by the binary extended GCD algorithm until the condition is met. In some implementations of the method 400, computing the binary extended GCD may further include performing a second Montgomery multiplication using the second value and two to the power of the first value to obtain a third value. In some implementations of the method 400, the third value may be the second output value. In some implementations of the method 400, computing the binary extended GCD may further include performing a third Montgomery multiplication using the fourth variable and two to the power of the first value to obtain a fourth value. In some implementations of the method 400, computing the binary extended GCD may further include performing a fourth Montgomery multiplication using the fourth value and two to the power of the first value to obtain a fifth value. In some implementations of the method 400, the fifth value may be the third output value.

In other implementations of the method 400, the extended GCD can be used to compute a modular inverse. For example, considering u g+v h=gcd(g,h) as described herein, the method can compute modulo n, while setting h equal to n, then as a result, the variable u will be the inverse of g. In this case, the Montgomery multiplication can be performed on u to return the modular inverse of g. In some cases, the Montgomery multiplication may not be performed on the variable v.

In some implementations of the method 400, the set of identities may include a first identity that a GCD of the first variable and the second variable is equal to a GCD of the second variable and the first variable. In some implementations of the method 400, the set of identities may include a second identity that a GCD of the first variable and the second variable is equal to two times a GCD of the first variable multiplied by two and the second variable multiplied by two. In some implementations of the method 400, the second identity may be applied when both the first variable and the second variable are both even numbers. In some implementations of the method 400, the set of identities may include a third identity that a GCD of the first variable and the second variable is equal to a GCD of the first variable multiplied by two and the second variable. In some implementations of the method 400, the third identity may be applied when the first variable is even and the second variable is odd. In some implementations of the method 400, the third identity may require that the fifth variable and the sixth variable are each multiplied by two. In some implementations of the method 400, the set of identities may include a fourth identity that a GCD of the first variable and the second variable is equal to a GCD of a difference between the first variable and the second variable being multiplied by two and the second variable. In some implementations of the method 400, the fourth identity may be applied when both the first variable and the second variable are odd and the first variable is greater than the second variable. In some implementations of the method 400, the fourth identity may require that the fifth variable is subtracted from the third variable. In some implementations of the method 400, the fourth identity may require that the sixth variable is subtracted from the fourth variable. In some implementations of the method 400, the fourth identity may require that the fifth variable and the sixth variable are each multiplied by two. In some implementations of the method 400, the fourth identity may require that the second counter is incremented. In some implementations of the method 400, the set of identities may include a fifth identity that a GCD of the first variable and the second variable is equal to a GCD of a sum of the first variable and the second variable with the sum being multiplied by four and the second variable if a first condition is met or a GCD of a difference between the first variable and the second variable with the difference being multiplied by four and the second variable if the first condition is not met. In some implementations of the method 400, the first condition may be met when an output of a logical- and operation of two and a result of an exclusive-or operation of the first variable and the second variable is equal to two. In some implementations of the method 400, the fifth identity may be applied when the first variable is equal to or greater than the second variable. In some implementations of the method 400, the fifth identity may require that the fifth variable is added to the third variable. In some implementations of the method 400, the fifth identity may require that the sixth variable is added to the fourth variable. In some implementations of the method 400, the fifth identity may require that the fifth variable and the sixth variable are each multiplied by four. In some implementations of the method 400, the fifth identity may require that the second counter is incremented by two if the first condition is met or requires that the fifth variable is subtracted from the third variable. In some implementations of the method 400, the fifth identity may require that the sixth variable is subtracted from the fourth variable. In some implementations of the method 400, the fifth identity may require that the fifth variable and the sixth variable are each multiplied by four. In some implementations of the method 400, the fifth identity may require that the second counter is incremented by two if the first condition is not met. In some implementations of the method 400, the set of identities may include a sixth identity that a GCD of the first variable and the first variable is equal to the first variable.

In some implementations of the method 400, computing the binary extended GCD may further include repeatedly applying a set of identities to a first variable and a second variable until a condition is met. In some implementations of the method 400, the condition may include the first variable being equal to the second variable or the second variable being equal to zero. In some implementations of the method 400, the condition may represent a GCD of a product of the first variable and two to the power of a first number of multiplications with the inverse of two that were done by the binary extended GCD algorithm until the condition is met.

In some implementations of the method 400, computing the binary extended GCD may further include performing an initialization operation to set the first variable equal to the first input value. In some implementations of the method 400, the second variable equal to the second input value. In some implementations of the method 400, the third variable equal to one. In some implementations of the method 400, the fourth variable equal to zero. In some implementations of the method 400, the fifth variable equal to zero. In some implementations of the method 400, the sixth variable equal to one, a first counter to zero. In some implementations of the method 400, a second counter to zero. In some implementations of the method 400, computing the binary extended GCD may further include performing a second operation to increment the first counter, divide the first variable by two, and divide the second variable by two, responsive to both the first variable and the second variable being even numbers. In some implementations of the method 400, computing the binary extended GCD may further include performing a third operation to switch the first variable and the second variable, switch the third variable and the fifth variable, and switch the fourth variable and the sixth variable, responsive to the second variable being an even number. The third operation is when the second variable is even, as the method tries to start with the second variable being odd, and if the first variable and the second variable are both odd, then the method does nothing. Then, the second check is not necessary as the second variable will always be odd. That is, the first variable is divided by two until it is odd and then maybe switch the first variable to the second variable, but the switch cannot occur if the first variable is event. In some implementations of the method 400, computing the binary extended GCD may further include performing a fourth operation to check whether the first variable is equal to the second variable. In some implementations of the method 400, computing the binary extended GCD may further include performing a fifth operation to increment the second counter, divide the first variable by two, calculate a product of two and the fifth variable modulus n, and calculate a product of two and the sixth variable modulus n, responsive to the first variable being an even number and the first variable not being equal to the second variable. In some implementations of the method 400, computing the binary extended GCD may further include performing a sixth operation to subtract the second variable from the first variable, subtract the fifth variable from the third variable, and subtract the sixth variable from the fourth variable, responsive to the first variable being an odd number and the first variable not being equal to the second variable.

In some implementations of the method 400, computing the binary extended GCD may further include performing a seventh operation to multiply the first variable by two to the power of the current number of times the first identity is applied. In some implementations of the method 400, computing the binary extended GCD may further include performing an eighth operation to perform a first Montgomery multiplication using the third variable and two to the power of a first value to obtain a second value. In some implementations of the method 400, the first value may be a difference between half of the second counter and a bit length of (n). In some implementations of the method 400, computing the binary extended GCD may further include performing a ninth operation to perform a second Montgomery multiplication using the second value and two to the power of the first value to obtain a third value. In some implementations of the method 400, the third value may be the second output value. In some implementations of the method 400, computing the binary extended GCD may further include performing a tenth operation to perform a third Montgomery multiplication using the fourth variable and two to the power of the first value to obtain a fourth value. In some implementations of the method 400, computing the binary extended GCD may further include performing an eleventh operation to perform a fourth Montgomery multiplication using the fourth value and two to the power of the first value to obtain a fifth value. In some implementations of the method 400, the fifth value may be the third output value.

In some implementations of the method 400, computing the binary extended GCD may further include tracking a first number of times a first identity is applied by the binary extended GCD algorithm until a condition is met. In some implementations of the method 400, the condition may include a first variable being equal to a second variable or the second variable being equal to zero. In some implementations of the method 400, computing the binary extended GCD may further include multiplying the first output value by two to the power of the first number to obtain the binary extended GCD. In some implementations of the method 400, computing the binary extended GCD may further include issuing one or more commands to a second processor to compute, using a Montgomery multiplication, a product of the first variable and the second variable modulus n. In some implementations of the method 400, where n may be an input modulus value specified by the cryptographic operation. In some implementations of the method 400, computing the binary extended GCD may further include receiving the second output value and the third output value from the second processor.

In some implementations of the method 400, computing the binary extended GCD may further include setting the first variable equal to the first input value, and the second variable equal to the second input value, a third variable equal to one, a fourth variable equal to zero, a fifth variable equal to zero, and a sixth variable equal to one. In some implementations of the method 400, computing the binary extended GCD may further include repeatedly applying a set of identities to the first variable and the second variable until the condition is met. In some implementations of the method 400, the set of identities may include the first identity that is applied when both the first variable and the second variable are even values. In some implementations of the method 400, issuing the one or more to the second processor may include issuing the one or more commands to the second processor after the condition is met.

In some implementations of the method 400, issuing the one or more commands may include issuing, to the second processor, a first command for a first Montgomery multiplication using the third variable and two to the power of a first value to obtain a second value. In some implementations of the method 400, the first value may be a difference between half of a second counter and a bit length of (n). In some implementations of the method 400, issuing the one or more commands may include issuing, to the second processor, a second command for a second Montgomery multiplication using the second value and two to the power of the first value to obtain a third value. In some implementations of the method 400, the third value may be the second output value. In some implementations of the method 400, issuing the one or more commands may include issuing, to the second processor, a third command for a third Montgomery multiplication using the fourth variable and two to the power of the first value to obtain a fourth value. In some implementations of the method 400, issuing the one or more commands may include issuing, to the second processor, a fourth command for a fourth Montgomery multiplication using the fourth value and two to the power of the first value to obtain a fifth value. In some implementations of the method 400, the fifth value may be the third output value.

In some implementations of the method 400, computing the binary extended GCD may further include performing an initialization operation to set the first variable equal to the first input value. In some implementations of the method 400, the second variable equal to the second input value. In some implementations of the method 400, the third variable equal to one. In some implementations of the method 400, the fourth variable equal to zero. In some implementations of the method 400, the fifth variable equal to zero. In some implementations of the method 400, the sixth variable equal to one, a first counter to zero. In some implementations of the method 400, a second counter to zero. In some implementations of the method 400, computing the binary extended GCD may further include performing a second operation to increment the first counter, divide the first variable by two, and divide the second variable by two. In some implementations of the method 400, responsive to both the first variable and the second variable being even numbers. In some implementations of the method 400, computing the binary extended GCD may further include performing a third operation to switch the first variable and the second variable, switch the third variable and the fifth variable, and switch the fourth variable and the sixth variable. In some implementations of the method 400, responsive to the second variable being an even number. In some implementations of the method 400, computing the binary extended GCD may further include performing a fourth operation to check whether the first variable is equal to the second variable. In some implementations of the method 400, computing the binary extended GCD may further include performing a fifth operation to increment the second counter, divide the first variable by two, calculate a product of two and the fifth variable modulus n, and calculate a product of two and the sixth variable modulus n. In some implementations of the method 400, responsive to the first variable being an even number and the first variable not being equal to the second variable. In some implementations of the method 400, computing the binary extended GCD may further include performing a sixth operation to subtract the second variable from the first variable, subtract the fifth variable from the third variable, and subtract the sixth variable from the fourth variable. In some implementations of the method 400, responsive to the first variable being an odd number and the first variable not being equal to the second variable. In some implementations of the method 400, computing the binary extended GCD may further include performing a seventh operation to multiply the first variable by two to the power of the current number of times the first identity is applied.

One aspect of the present disclosure relates to a system configured for corrections to the "almost" binary extended GCD in a cryptographic operation of a cryptographic process. The system may include one or more hardware processors configured by machine-readable instructions. The processor(s) may be configured to receive, from a cryptographic process, a command to compute a binary extended greatest common denominator of a first input value and a second input value for a cryptographic operation. The processor(s) may be configured to compute, by a binary extended GCD algorithm, the binary extended GCD using a multiplication with an inverse of two, instead of a division by two, to obtain a first output value. The processor(s) may be configured to compute, by the binary extended GCD algorithm, a second output value and a third output value. The second output value may be a first integer and the third output value is a second integer. A sum of a first product of the first integer and the first input value and a second product of the second integer and the second input value may be equal to the first output value. The processor(s) may be configured to return, to the cryptographic process, the first output value, the second output value, and the third output value. The computing system may also perform the other operations as described herein.

Figure 5:
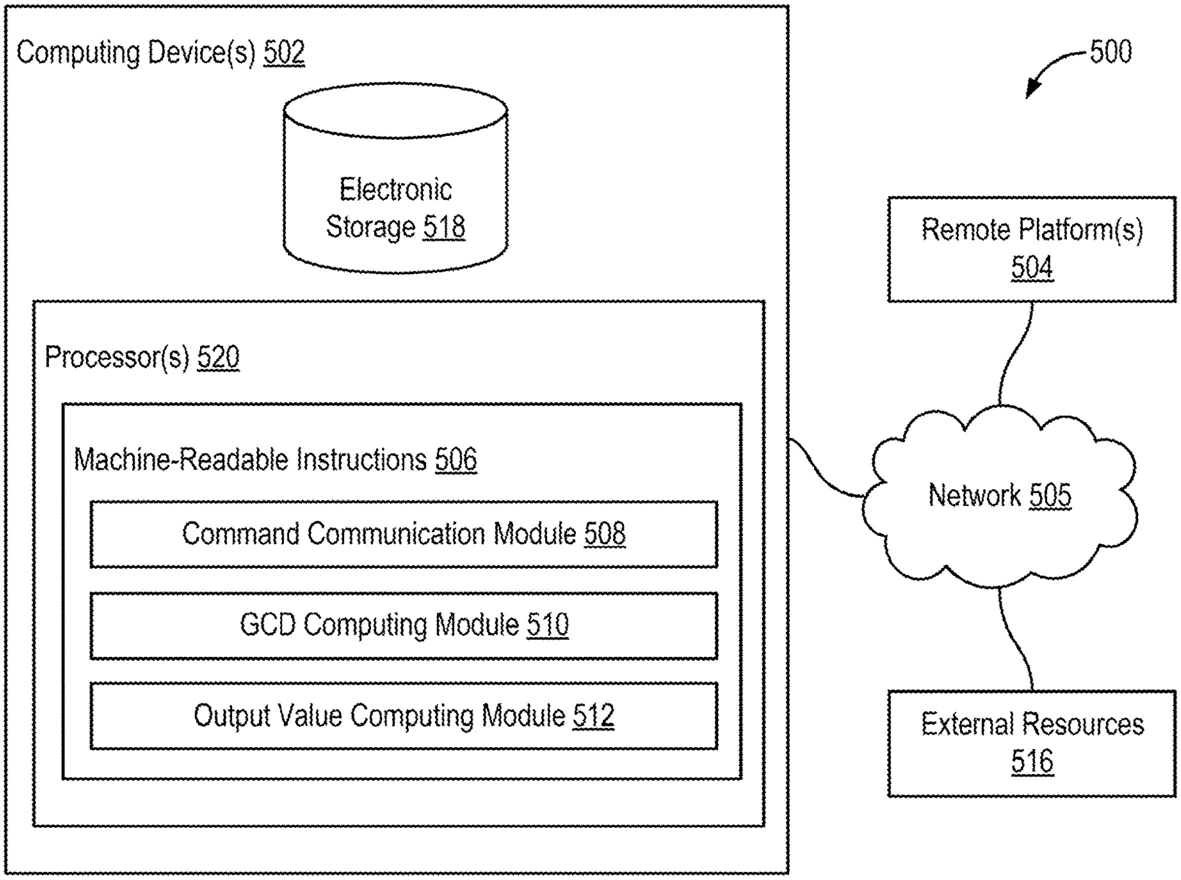
FIG. 5 is a block diagram of a system configured for corrections to the "almost" binary extended GCD in a cryptographic operation of a cryptographic process according to one embodiment.

FIG. 5 is a block diagram of an example computing system 500 configured for corrections to the "almost" binary extended GCD in a cryptographic operation of a cryptographic process in which embodiments described herein may operate. The computing system 500 may include one or more computing devices 502 and one or more remote platforms 504 capable of communicating with computing device(s) 502 via a network 505. Network 505 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 505 may have any suitable communication range associated therewith and may include, for example, public networks (e.g., the Internet), metropolitan area networks (MANs), wide area networks (WANs), local area networks (LANs), or personal area networks (PANs). In addition, the network 505 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

A given remote platform 504 may include any type of mobile computing device (e.g., that has a finite power source) or traditionally non-portable computing device. Remote platform 504 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. Remote platform 504 may also be a traditionally non-portable computing device such as a desktop computer, a server computer, or the like. Remote platform 504 may be configured with functionality to enable execution of an application for corrections to the "almost" binary extended GCD in a cryptographic operation of a cryptographic process.

Communication between computing device(s) 502 and remote platform(s) 504 may be enabled via any communication infrastructure, such as public and private networks. One example of such an infrastructure includes a combination of a wide area network (WAN) and wireless infrastructure, which allows a user to use a given remote platform 504 to interact with components of computing device(s) 502 without being tethered to computing device(s) 502 via hardwired links. The wireless infrastructure may be provided by one or multiple wireless communications systems. One of the wireless communication systems may be a Wi-Fi access point connected with the network 505. Another of the wireless communication systems may be a wireless carrier system that can be implemented using various data processing equipment, communication towers, etc. Alternatively, or in addition, the wireless carrier system may rely on satellite technology to exchange information with remote platform(s) 504.

Computing device(s) 502 may be set up by an entity such as a company or a public sector organization to provide one or more services (such as various types of cloud-based computing or storage) accessible via the Internet and/or other networks to remote platform(s) 504. Computing device(s) 502 may include numerous data centers hosting various resource pools, such as collections of physical and/or virtualized computer servers, storage devices, networking equipment and the like, needed to implement and distribute the infrastructure and services offered by computing device(s) 502, including to provide multi- and single-tenant services.

Computing device(s) 502 may be configured by machine-readable instructions 506 to provide a service for corrections to the "almost" binary extended GCD in a cryptographic operation of a cryptographic process and associated services, provide other computing resources or services, such as a virtual compute service and storage services, such as object storage services, block-based storage services, data warehouse storage service, archive storage service, data store, and/or any other type of network based services (which may include various other types of storage, processing, analysis, communication, event handling, visualization, and security services, such as a code execution service that executes code without client management of the execution resources and environment). Remote platform(s) 504 may access these various services offered by computing device(s) 502 via the network 505, for example through an application programming interface (API) or a command line interface (CLI). Likewise network-based services may themselves communicate and/or make use of one another to provide different services.

Machine-readable instructions 506 may include one or more instruction modules. The instruction modules may include computer program modules. The instruction modules may include one or more of command communication module 508, GCD computing module 510, modular exponentiation module 512, and/or other instruction modules.

Command communication module 508 may be configured to receive, from a cryptographic process, a command to compute a binary extended greatest common denominator of a first input value and a second input value for a cryptographic operation. The command communication module 508 may also receive an input modulus value specified in the command. Command communication module 508 may be configured to return, to the cryptographic process, the first output value, the second output value, and the third output value. Command communication module 508 may be configured to issue one or more commands to a second processor. By way of non-limiting example, issuing the one or more commands may include issuing, to the second processor, a first command for a first Montgomery multiplication using the third variable (u) and two to the power of a first value to obtain a second value, wherein the first value is a difference between half of a second counter (k) and a bit length of (n); issuing, to the second processor, a second command for a second Montgomery multiplication using the second value and two to the power of the first value to obtain a third value, wherein the third value is the second output value (u); issuing, to the second processor, a third command for a third Montgomery multiplication using the fourth variable (v) and two to the power of the first value to obtain a fourth value; and issuing, to the second processor, a fourth command for a fourth Montgomery multiplication using the fourth value and two to the power of the first value to obtain a fifth value, wherein the fifth value is the third output value (v).

GCD computing module 510 may be configured to compute, by a binary extended GCD algorithm, the binary extended GCD using a multiplication with an inverse of two, instead of a division by two, to obtain a first output value. Computing the binary extended GCD may include tracking, using the first counter, a first number of times a first identity of the set of identities is applied by the binary extended GCD algorithm until the condition is met. Computing the binary extended GCD may include tracking, using the second counter, a second number of multiplications with the inverse of two that have been done by the binary extended GCD algorithm until the condition is met. Computing the binary extended GCD may include multiplying the intermediate GCD by two to the power of the first number in the first counter to obtain the first output value. Computing the binary extended GCD may further include, after the condition is met, multiplying the first variable by two to the power of a current number of times a first identity of the set of identities is applied by the binary extended GCD algorithm when the condition is met.

By way of non-limiting example, computing the binary extended GCD may include setting a first counter to zero, a second counter to zero, a first variable equal to the first input value, and a second variable equal to the second input value. An input modulus value can be specified in the command. By way of non-limiting example, computing the binary extended GCD may further include setting a third variable equal to one, a fourth variable equal to zero, a fifth variable equal to zero, and a sixth variable equal to one. By way of non-limiting example, computing the binary extended GCD may further include repeatedly applying the set of identities to the third variable, the fourth variable, the fifth variable, and the sixth variable until the condition is met.

Modular exponentiation module 512 may be configured to perform Montgomery multiplications, as described herein. By way of non-limiting example, the modular exponentiation module 512 performs a first Montgomery multiplication using the third variable and two to the power of a first value to obtain a second value. The first value may be a difference between half of the second counter and a bit length of (n). By way of non-limiting example, the modular exponentiation module 512 performs a second Montgomery multiplication using the second value and two to the power of the first value to obtain a third value. By way of non-limiting example, the modular exponentiation module 512 performs a third Montgomery multiplication using the fourth variable and two to the power of the first value to obtain a fourth value. By way of non-limiting example, the modular exponentiation module 512 performs a fourth Montgomery multiplication using the fourth value and two to the power of the first value to obtain a fifth value.

By way of non-limiting example, the modular exponentiation module 512 performs, after the GCD computing module 510 sets a first variable equal to the first input value, a second variable equal to the second input value, a third variable equal to one, a fourth variable equal to zero, a fifth variable equal to zero, and a sixth variable equal to one, and computes an output GCD, a first Montgomery multiplication using the third variable and two to the power of a first value to obtain a second value. The first value may be a difference between half of a second number of a second counter and a bit length of (n). By way of non-limiting example, the modular exponentiation module 512 performs a second Montgomery multiplication using the second value and two to the power of the first value to obtain a third value. By way of non-limiting example, the modular exponentiation module 512 performs a third Montgomery multiplication using the fourth variable and two to the power of the first value to obtain a fourth value. By way of non-limiting example, the modular exponentiation module 512 performs a fourth Montgomery multiplication using the fourth value and two to the power of the first value to obtain a fifth value. The Montgomery multiplication may be based on a current number of multiplications with the inverse of two that has been done by the binary extended GCD algorithm when the condition is met. The second number may be a number of multiplications with the inverse of two that have been done by the binary extended GCD algorithm until the condition is met.

The set of identities may include a first identity that a GCD of the first variable and the second variable is equal to a GCD of the second variable and the first variable. The set of identities may include a second identity that a GCD of the first variable and the second variable is equal to two times a GCD of the first variable multiplied by two and the second variable multiplied by two. The second identity may be applied when both the first variable and the second variable are both even numbers. The set of identities may include a third identity that a GCD of the first variable and the second variable is equal to a GCD of the first variable multiplied by two and the second variable. The third identity may be applied when the first variable is even and the second variable is odd. The third identity may require that the fifth variable and the sixth variable are each multiplied by two. The set of identities may include a fourth identity that a GCD of the first variable and the second variable is equal to a GCD of a difference between the first variable and the second variable being multiplied by two and the second variable. The fourth identity may be applied when both the first variable and the second variable are odd and the first variable is greater than the second variable. The fourth identity may require that the fifth variable is subtracted from the third variable. The fourth identity may require that the sixth variable is subtracted from the fourth variable. The fourth identity may require that the fifth variable and the sixth variable are each multiplied by two. The fourth identity may require that the second counter is incremented. The first condition may be met when an output of a logical-AND operation of two and a result of an exclusive- or operation of the first variable and the second variable is equal to two. The fifth identity may be applied when the first variable is equal to or greater than the second variable. The fifth identity may require that the fifth variable is added to the third variable. The fifth identity may require that the sixth variable is added to the fourth variable. The fifth identity may require that the fifth variable and the sixth variable are each multiplied by four. The fifth identity may require that the second counter is incremented by two if the first condition is met or requires that the fifth variable is subtracted from the third variable. The fifth identity may require that the sixth variable is subtracted from the fourth variable. The fifth identity may require that the fifth variable and the sixth variable are each multiplied by four. The fifth identity may require that the second counter is incremented by two if the first condition is not met. The set of identities may include a sixth identity that a GCD of the first variable and the first variable is equal to the first variable.

By way of non-limiting example, GCD computing module 510 can perform the initialization operation, the second operation, the third operation, the fourth operation, the fifth operation, the sixth operation, the seventh operation, the eighth operation, the ninth operation, the tenth operation, the eleventh operation, the twelfth operation, or any combination of the operations described above.

In some implementations, computing device(s) 502 and/or remote platform(s) 504 may be operatively linked via a network to external resources 516. External resources 516 may include sources of information outside of computing system 500, external entities participating with computing system 500, and/or other resources. In some implementations, some or all of the functionality attributed herein to external resources 516 may be provided by resources included in computing system 500.

Computing device(s) 502 may include electronic storage 518, one or more processors 520, and/or other components. Electronic storage 518 may comprise non-transitory storage media that electronically stores information. The electronic storage media of electronic storage 518 may include one or both of system storage that is provided integrally (i.e., substantially non-removable) with computing device(s) 502 and/or removable storage that is removably connectable to computing device(s) 502 via, for example, a port (e.g., a USB port, a firewire port, etc.) or a drive (e.g., a disk drive, etc.). Electronic storage 518 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 518 may include one or more virtual storage resources (e.g., cloud storage, a virtual private network, and/or other virtual storage resources). Electronic storage 518 may store software algorithms, information determined by processor(s) 520, information received from computing device(s) 502, information received from remote platform(s) 504, and/or other information that enables computing device(s) 502 to function as described herein.

Processor(s) 520 may be configured to provide information processing capabilities in computing device(s) 502. As such, processor(s) 520 may include one or more of a digital processor, an analog processor, a digital circuit designed to process information, an analog circuit designed to process information, a state machine, and/or other mechanisms for electronically processing information. Although processor(s) 520 is shown in FIG. 5 as a single entity, this is for illustrative purposes only. In some implementations, processor(s) 520 may include a plurality of processing units. These processing units may be physically located within the same device, or processor(s) 520 may represent processing functionality of a plurality of devices operating in coordination. Processor(s) 520 may be configured to execute modules 508, 510, and/or 512, and/or other modules. Processor(s) 520 may be configured to execute modules 508, 510, and/or 512, and/or other modules by software; hardware; firmware; some combination of software, hardware, and/or firmware; and/or other mechanisms for configuring processing capabilities on processor(s) 520. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, and/or 512 are illustrated in FIG. 5 as being implemented within a single processing unit, in implementations in which processor(s) 520 includes multiple processing units, one or more of modules 508, 510, and/or 512 may be implemented remotely from the other modules. The description of the functionality provided by the different modules 508, 510, and/or 512 described below is for illustrative purposes, and is not intended to be limiting, as any of modules 508, 510, and/or 512 may provide more or less functionality than is described. For example, one or more of modules 508, 510, and/or 512 may be eliminated, and some or all of its functionality may be provided by other ones of modules 508, 510, and/or 512. As another example, processor(s) 520 may be configured to execute one or more additional modules that may perform some or all of the functionality attributed below to one of modules 508, 510, and/or 512.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work to others skilled in the art most effectively. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, terms such as "performing", "receiving", "determining", "sending", "computing" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMS, EEPROMs, magnetic or optical cards, or any type of media suitable for storing electronic instructions. The methods and illustrative examples described herein are not inherently related to any particular computer or other apparatus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description above. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

The above description is intended to be illustrative, and not restrictive. Although the present disclosure has been described with reference to specific illustrative examples, it will be recognized that the present disclosure is not limited to the examples described. The scope of the disclosure should be determined with reference to the following claims, along with the full scope of equivalents to which the claims are entitled.

What is claimed is:

1. A computing system comprising:

a memory device to store instructions of a binary extended greatest common divisor (GCD) algorithm; and a processing device coupled to the memory device, wherein the instructions, when executed by the processing device, perform operations comprising:

receive, from a cryptographic process, a command to execute a binary extended GCD algorithm based at least on a first input value (x) and a second input value (y);

execute the binary extended GCD algorithm to obtain a first output value (α), wherein the processing device executes the binary extended GCD algorithm by deferring a plurality of divisions by two, wherein the binary extended GCD algorithm computes a second output value (u) and a third output value (v), wherein the second output value is a first integer (a) and the third output value is a second integer (b), wherein a sum of a first product of the first integer and the first input value (x) and a second product of the second integer and the second input value (y) is equal to the first output value, and wherein the deferred plurality of divisions by two is replaced with a plurality of Montgomery multiplications by a power of two, performed by an additional processing device, wherein the power of two is determined based on a number of the deferred plurality of divisions by two; and generate one or more cryptographic keys for the cryptographic process using one or more of the first output value (α), the second output value (u), or the third output value (v).

2. The computing system of claim 1, wherein the command comprises an input modulus value (n), wherein the first output value (α), the second output value (u), and the third output value (v) are modulo n numbers.

3. The computing system of claim 1, wherein the processing device, to execute the binary extended GCD algorithm, is to:

set a first counter (r) to zero, a second counter (k) to zero, a first variable (α) equal to the first input value (x), and a second variable (β) equal to the second input value (y);

determine an intermediate GCD by repeatedly applying a set of identities to the first variable (α) and the second variable (β) until a condition is met, wherein the condition comprises the first variable (α) being equal to the second variable (β) or the second variable (β) being equal to zero;

track, using the first counter (r), a first number of times a first identity of the set of identities is applied by the binary extended GCD algorithm until the condition is met;

track, using the second counter (k), a second number of multiplications with the inverse of two that have been done by the binary extended GCD algorithm until the condition is met;

multiply the intermediate GCD by two to the power of the first number in the first counter (r) to obtain the first output value (α); and compute, using a Montgomery multiplication, a product of the first variable (α) and the second variable (β) modulus n, where n is an input modulus value specified in the command.

4. The computing system of claim 3, wherein the processing device, to execute the binary extended GCD algorithm, is further to:

set a third variable (u) equal to one, a fourth variable (v) equal to zero, a fifth variable(s) equal to zero, and a sixth variable (t) equal to one;

repeatedly apply the set of identities to the third variable (u), the fourth variable (v), the fifth variable(s), and the sixth variable (t) until the condition is met, and wherein, to compute the product, the processing device is further to:

perform a first Montgomery multiplication using the third variable (u) and two to the power of a first value to obtain a second value, wherein the first value is a difference between half of the second counter (k) and a bit length of (n);

perform a second Montgomery multiplication using the second value and two to the power of the first value to obtain a third value, wherein the third value is the second output value (u);

perform a third Montgomery multiplication using the fourth variable (v) and two to the power of the first value to obtain a fourth value; and perform a fourth Montgomery multiplication using the fourth value and two to the power of the first value to obtain a fifth value, wherein the fifth value is the third output value (v).

5. The computing system of claim 4, wherein the set of identities comprises:

a first identity that a GCD of the first variable (α) and the second variable (β) is equal to a GCD of the second variable (β) and the first variable (α);

a second identity that a GCD of the first variable (α) and the second variable (β) is equal to two times a GCD of the first variable (α) multiplied by two and the second variable (β) multiplied by two, wherein the second identity is applied when both the first variable (α) and the second variable (β) are both even numbers;

a third identity that a GCD of the first variable (α) and the second variable (β) is equal to a GCD of the first variable (α) multiplied by two and the second variable (β), wherein the third identity is applied when the first variable (α) is even and the second variable (β) is odd, wherein the third identity requires that the fifth variable(s) and the sixth variable (t) are each multiplied by two;

a fourth identity that a GCD of the first variable (α) and the second variable (β) is equal to a GCD of a difference between the first variable (α) and the second variable (β) being multiplied by two and the second variable (β), wherein the fourth identity is applied when both the first variable (α) and the second variable (β) are odd and the first variable (α) is greater than the second variable (β), wherein the fourth identity requires that the fifth variable(s) is subtracted from the third variable (u), the sixth variable (t) is subtracted from the fourth variable (v), the fifth variable(s) and the sixth variable (t) are each multiplied by two, and the second counter (k) is incremented;

a fifth identity that a GCD of the first variable (α) and the second variable (β) is equal to a GCD of a sum of the first variable (α) and the second variable (β), the sum being multiplied by four, and the second variable (β) if a first condition is met or a GCD of a difference between the first variable (α) and the second variable (β), the difference being multiplied by four, and the second variable (β) if the first condition is not met, wherein the first condition is met when an output of a logical-AND operation of two and a result of an exclusive-OR (XOR) operation of the first variable (α) and the second variable (β) is equal to two, wherein the fifth identity is applied when the first variable (α) is equal to or greater than the second variable (β), wherein the fifth identity requires that the fifth variable(s) is added to the third variable (u), the sixth variable (t) is added to the fourth variable (v), the fifth variable(s) and the sixth variable (t) are each multiplied by four, and the second counter (k) is incremented by two if the first condition is met or requires that the fifth variable(s) is subtracted from the third variable (u), the sixth variable (t) is subtracted from the fourth variable (v), the fifth variable(s) and the sixth variable (t) are each multiplied by four, and the second counter (k) is incremented by two if the first condition is not met; and a sixth identity that a GCD of the first variable (α) and the first variable (α) is equal to the first variable (α).

6. The computing system of claim 1, wherein the processing device, to execute the binary extended GCD algorithm, is to repeatedly apply a set of identities to a first variable (α) and a second variable (β) until a condition is met, wherein the condition comprises the first variable (α) being equal to the second variable (β) or the second variable (β) being equal to zero, wherein the condition represents a GCD of a product of the first variable (α) and two to the power of a first number of multiplications with the inverse of two that were done by the binary extended GCD algorithm until the condition is met.

7. The computing system of claim 1, wherein the processing device, to execute the binary extended GCD algorithm, is to:

set a first variable (α) equal to the first input value (x), a second variable (β) equal to the second input value (y), a third variable (u) equal to one, a fourth variable (v) equal to zero, a fifth variable(s) equal to zero, and a sixth variable (t) equal to one;

repeatedly apply a set of identities to the first variable (α) and the second variable (β) until a condition is met, wherein the condition comprises the first variable (α) being equal to the second variable (β) or the second variable (β) being equal to zero;

after the condition is met, multiply the first variable (α) by two to the power of a current number of times a first identity of the set of identities is applied by the binary extended GCD algorithm when the condition is met, wherein the first identity is applied when both the first variable (α) and the second variable (β) are even values; and after the condition is met, compute, using a Montgomery multiplication, a product of the first variable (α) and the second variable (β) modulus n, where n is an input modulus value specified in the command, wherein the Montgomery multiplication is based on a current number of multiplications with the inverse of two that has been done by the binary extended GCD algorithm when the condition is met.

8. The computing system of claim 7, wherein the processing device, to compute the product of the first variable (α) and the second variable (β) modulus n, is to:

perform a first Montgomery multiplication using the third variable (u) and two to the power of a first value to obtain a second value, wherein the first value is a difference between half of a second number of a second counter (k) and a bit length of (n), wherein the second number is a number of multiplications with the inverse of two that have been done by the binary extended GCD algorithm until the condition is met;

perform a second Montgomery multiplication using the second value and two to the power of the first value to obtain a third value, wherein the third value is the second output value (u);

perform a third Montgomery multiplication using the fourth variable (v) and two to the power of the first value to obtain a fourth value; and perform a fourth Montgomery multiplication using the fourth value and two to the power of the first value to obtain a fifth value, wherein the fifth value is the third output value (v).

9. The computing system of claim 7, wherein the binary extended GCD algorithm comprises:

an initialization operation to set the first variable (α) equal to the first input value (x), the second variable (β) equal to the second input value (y), the third variable (u) equal to one, the fourth variable (v) equal to zero, the fifth variable(s) equal to zero, the sixth variable (t) equal to one, a first counter (r) to zero, and a second counter (k) to zero;

a second operation to increment the first counter (r), divide the first variable (α) by two, and divide the second variable (β) by two, responsive to both the first variable (α) and the second variable (β) being even numbers;

a third operation to switch the first variable (α) and the second variable (β), switch the third variable (u) and the fifth variable(s), and switch the fourth variable (v) and the sixth variable (t), responsive to the second variable (β) being an even number;

a fourth operation to check whether the first variable (α) is equal to the second variable (β);

a fifth operation to increment the second counter (k), divide the first variable (α) by two, calculate a product of two and the fifth variable(s) modulus n, and calculate a product of two and the sixth variable (t) modulus n, responsive to the first variable (α) being an even number and the first variable (α) not being equal to the second variable (β); and a sixth operation to subtract the second variable (β) from the first variable (α), subtract the fifth variable(s) from the third variable (u), and subtract the sixth variable (t) from the fourth variable (v), responsive to the first variable (α) being an odd number and the first variable (α) not being equal to the second variable (β).

10. The computing system of claim 9, wherein the binary extended GCD algorithm further comprises:

a seventh operation to multiply the first variable (α) by two to the power of the current number of times the first identity is applied;

an eighth operation to perform a first Montgomery multiplication using the third variable (u) and two to the power of a first value to obtain a second value, wherein the first value is a difference between half of the second counter (k) and a bit length of (n);

a ninth operation to perform a second Montgomery multiplication using the second value and two to the power of the first value to obtain a third value, wherein the third value is the second output value (u);

a tenth operation to perform a third Montgomery multiplication using the fourth variable (v) and two to the power of the first value to obtain a fourth value; and an eleventh operation to perform a fourth Montgomery multiplication using the fourth value and two to the power of the first value to obtain a fifth value, wherein the fifth value is the third output value (v).

11. A method comprising:

receiving, from a cryptographic process by a first processing device, a command to compute a binary extended greatest common divisor (GCD) of a first input value (x) and a second input value (y) for a cryptographic operation;

executing, by the first processing device, a binary extended GCD algorithm, wherein the binary extended GCD algorithm defers a plurality of divisions by two, to obtain a first output value (α);

computing, by the first processing device, a second output value (u) and a third output value (v), wherein the second output value is a first integer (α) and the third output value is a second integer (b), wherein a sum of a first product of the first integer and the first input value (x) and a second product of the second integer and the second input value (y) is equal to the first output value, and wherein the deferred plurality of divisions by two is replaced with a plurality of Montgomery multiplications by a power of two, performed by a second processing device, wherein the power of two is determined based on a number of the deferred plurality of divisions by two; and generating, by the first processing device, for the cryptographic process, one or more cryptographic keys using one or more of the first output value (α), the second output value (u), or the third output value (v).

12. The method of claim 11, wherein the first output value (α), the second output value (u), and the third output value (v) are modulo n values, where n is an input modulus value specified in the command.

13. The method of claim 11, wherein executing the binary extended GCD algorithm comprises:

setting a first counter (r) to zero, a second counter (k) to zero, a first variable (α) equal to the first input value (x), and a second variable (β) equal to the second input value (y);

determining an intermediate GCD by repeatedly applying a set of identities to the first variable (α) and the second variable (β) until a condition is met, wherein the condition comprises the first variable (α) being equal to the second variable (β) or the second variable (β) being equal to zero;

tracking, using the first counter (r), a first number of times a first identity of the set of identities is applied by the binary extended GCD algorithm until the condition is met;

tracking, using the second counter (k), a second number of multiplications with the inverse of two that have been done by the binary extended GCD algorithm until the condition is met;

multiplying the intermediate GCD by two to the power of the first number in the first counter (r) to obtain the first output value (α); and computing, using a Montgomery multiplication, a product of the first variable (α) and the second variable (β) modulus n, where n is an input modulus value specified in the command.

14. The method of claim 13, wherein executing the binary extended GCD algorithm further comprises:

setting a third variable (u) equal to one, a fourth variable (v) equal to zero, a fifth variable(s) equal to zero, and a sixth variable (t) equal to one;

repeatedly applying the set of identities to the third variable (u), the fourth variable (v), the fifth variable(s), and the sixth variable (t) until the condition is met, and wherein computing the product further comprises:

performing a first Montgomery multiplication using the third variable (u) and two to the power of a first value to obtain a second value, wherein the first value is a difference between half of the second counter (k) and a bit length of (n);

performing a second Montgomery multiplication using the second value and two to the power of the first value to obtain a third value, wherein the third value is the second output value (u);

performing a third Montgomery multiplication using the fourth variable (v) and two to the power of the first value to obtain a fourth value; and performing a fourth Montgomery multiplication using the fourth value and two to the power of the first value to obtain a fifth value, wherein the fifth value is the third output value (v).

15. The method of claim 11, wherein executing the binary extended GCD algorithm further comprises:

setting a first variable (α) equal to the first input value (x), and a second variable (β) equal to the second input value (y), a third variable (u) equal to one, a fourth variable (v) equal to zero, a fifth variable(s) equal to zero, and a sixth variable (t) equal to one;

repeatedly applying a set of identities to the first variable (α) and the second variable (β) until a condition is met, wherein the condition comprises the first variable (α) being equal to the second variable (β) or the second variable (β) being equal to zero;

after the condition is met, multiplying the first variable (α) by two to the power of a current number of times a first identity of the set of identities is applied by the binary extended GCD algorithm when the condition is met, wherein the first identity is applied when both the first variable (α) and the second variable (β) are even values; and after the condition is met, computing, using a Montgomery multiplication, a product of the first variable (α) and the second variable (β) modulus n, wherein the Montgomery multiplication is based on a current number of multiplications with the inverse of two that has been done by the binary extended GCD algorithm when the condition is met.

16. The method of claim 15, wherein executing the binary extended GCD algorithm further comprises:

performing a first Montgomery multiplication using the third variable (u) and two to the power of a first value to obtain a second value, wherein the first value is a difference between half of a second number of a second counter (k) and a bit length of (n), wherein the second number is a number of multiplications with the inverse of two that have been done by the binary extended GCD algorithm until the condition is met;

performing a second Montgomery multiplication using the second value and two to the power of the first value to obtain a third value, wherein the third value is the second output value (u);

performing a third Montgomery multiplication using the fourth variable (v) and two to the power of the first value to obtain a fourth value; and performing a fourth Montgomery multiplication using the fourth value and two to the power of the first value to obtain a fifth value, wherein the fifth value is the third output value (v).

17. A computing system comprising:

a memory device to store instructions of a binary extended greatest common divisor (GCD) algorithm;

a first processor coupled to the memory device; and a second processor coupled to the first processor and the memory device, wherein the instructions, when executed by the first processor, cause the first processor to:

execute, as part of a cryptographic operation, the binary extended GCD algorithm based at least on a first input value (x) and a second input value (y) to obtain a first output value (α), a second output value (u), and a third output value (v), wherein the binary extended GCD algorithm defers a plurality of divisions by two, wherein the second output value is a first integer (a) and the third output value is a second integer (b), wherein a sum of a first product of the first integer and the first input value (x) and a second product of the second integer and the second input value (y) is equal to the first output value;

track a first number of times a first identity is applied by the binary extended GCD algorithm until a condition is met, wherein the condition comprises a first variable (α) being equal to a second variable (β) or the second variable (β) being equal to zero;

multiply the first output value (α) by two to the power of the first number to obtain the binary extended GCD;

issue one or more commands to the second processor to update the second output value (u) and the third output value (v) by performing a plurality of Montgomery multiplications, each of the plurality of Montgomery multiplications multiplying the second output value (u) or the third output value (v) by a power of two determined based on a number of the deferred plurality of divisions by two;

receive the updated second output value (u) and the updated third output value (v) from the second processor; and generate one or more cryptographic keys using one or more of the first output value (α), the second output value (u), or the third output value (v).

18. The computing system of claim 17, wherein, to execute the binary extended GCD algorithm, the first processor is to:

set the first variable (α) equal to the first input value (x), and the second variable (β) equal to the second input value (y), a third variable (u) equal to one, a fourth variable (v) equal to zero, a fifth variable(s) equal to zero, and a sixth variable (t) equal to one; and repeatedly apply a set of identities to the first variable (α) and the second variable (β) until the condition is met, wherein the set of identities comprises the first identity that is applied when both the first variable (α) and the second variable (β) are even values, wherein the one or more commands are issued to the second processor after the condition is met.

19. The computing system of claim 18, wherein, to issue the one or more commands, the first processor is to:

issue, to the second processor, a first command for a first Montgomery multiplication using the third variable (u) and two to the power of a first value to obtain a second value, wherein the first value is a difference between half of a second counter (k) and a bit length of (n);

issue, to the second processor, a second command for a second Montgomery multiplication using the second value and two to the power of the first value to obtain a third value, wherein the third value is the second output value (u);

issue, to the second processor, a third command for a third Montgomery multiplication using the fourth variable (v) and two to the power of the first value to obtain a fourth value; and issue, to the second processor, a fourth command for a fourth Montgomery multiplication using the fourth value and two to the power of the first value to obtain a fifth value, wherein the fifth value is the third output value (v).

20. The computing system of claim 18, wherein, to execute the binary extended GCD algorithm, the first processor is to perform the following comprising:

an initialization operation to set the first variable (α) equal to the first input value (x), the second variable (β) equal to the second input value (y), the third variable (u) equal to one, the fourth variable (v) equal to zero, the fifth variable(s) equal to zero, the sixth variable (t) equal to one, a first counter (r) to zero, and a second counter (k) to zero;

a second operation to increment the first counter (r), divide the first variable (α) by two, and divide the second variable (β) by two, responsive to both the first variable (α) and the second variable (β) being even numbers;

a third operation to switch the first variable (α) and the second variable (β), switch the third variable (u) and the fifth variable(s), and switch the fourth variable (v) and the sixth variable (t), responsive to the second variable (β) being an even number;

a fourth operation to check whether the first variable (α) is equal to the second variable (β);

a fifth operation to increment the second counter (k), divide the first variable (α) by two, calculate a product of two and the fifth variable(s) modulus n, and calculate a product of two and the sixth variable (t) modulus n, responsive to the first variable (α) being an even number and the first variable (α) not being equal to the second variable (β); and a sixth operation to subtract the second variable (β) from the first variable (α), subtract the fifth variable(s) from the third variable (u), and subtract the sixth variable (t) from the fourth variable (v), responsive to the first variable (α) being an odd number and the first variable (α) not being equal to the second variable (β);

a seventh operation to multiply the first variable (α) by two to the power of the current number of times the first identity is applied;

an eighth operation to perform a first Montgomery multiplication using the third variable (u) and two to the power of a first value to obtain a second value, wherein the first value is a difference between half of the second counter (k) and a bit length of (n);

a ninth operation to perform a second Montgomery multiplication using the second value and two to the power of the first value to obtain a third value, wherein the third value is the second output value (u);

a tenth operation to perform a third Montgomery multiplication using the fourth variable (v) and two to the power of the first value to obtain a fourth value; and an eleventh operation to perform a fourth Montgomery multiplication using the fourth value and two to the power of the first value to obtain a fifth value, wherein the fifth value is the third output value (v).

* * * * *